B. M. FINE.
INTERNAL COMBUSTION ENGINE AND ATTACHMENT THEREFOR.
APPLICATION FILED NOV. 25, 1919.
1,405,772.
Patented Feb. 7, 1922.
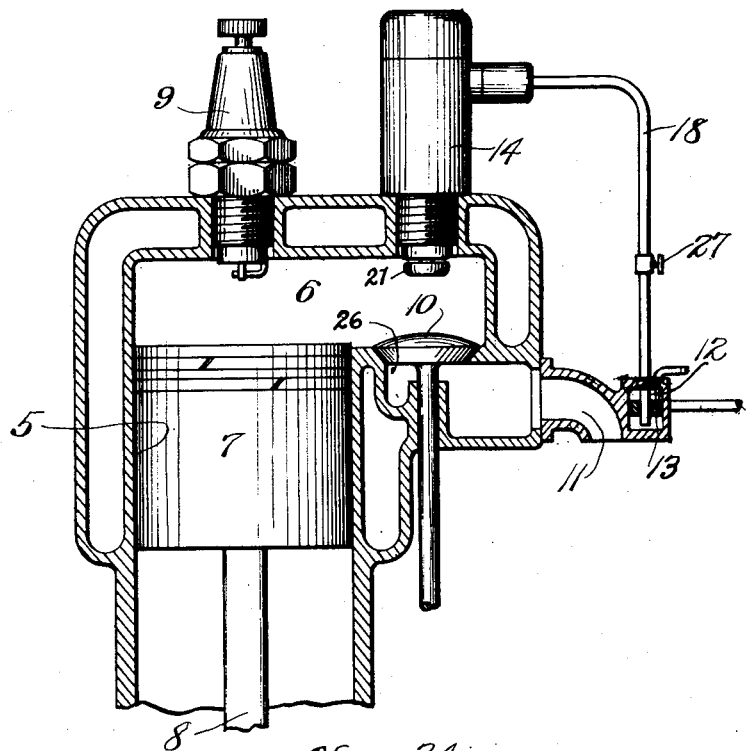
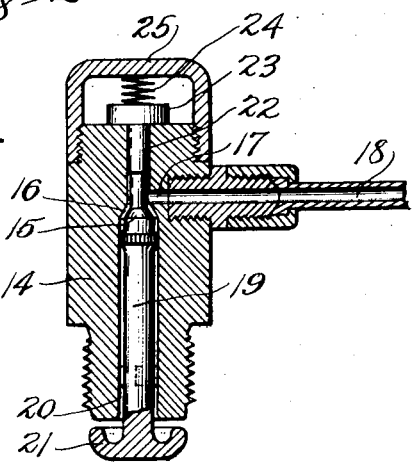
Inventor
Bernard M. Fine
By his Attorney
E. M. Marshall

UNITED STATES PATENT OFFICE.

BERNARD M. FINE, OF EAST ORANGE, NEW JERSEY.

INTERNAL-COMBUSTION ENGINE AND ATTACHMENT THEREFOR.

1,405,772.          Specification of Letters Patent.          Patented Feb. 7, 1922.

Application filed November 25, 1919. Serial No. 340,476.

*To all whom it may concern:*

Be it known that I, BERNARD M. FINE, a citizen of the United States of America, and a resident of East Orange, Essex County, and State of New Jersey, have invented certain new and useful Improvements in Internal-Combustion Engines and Attachments Therefor, of which the following is a specification.

This invention relates particularly to a simple device for improving existing engines and its object is to provide a simple attachment which may be easily applied to ordinary engines of the four cycle type to change them into engines of the semi-Diesel type.

Speaking generally, the invention involves the provision of special valve mechanism which may be screwed into the opening provided for a priming cup, for automatically admitting the fuel directly into the combustion chamber where it is vaporized and mixed with a volume of air which is separately admitted to the cylinder through the usual intake valve.

Various other features of the invention and details of construction will be set forth in the following specification, which is to be considered in conjunction with the accompanying drawing wherein I have illustrated a practical commercial embodiment of the invention.

In the drawing referred to, Figure 1 is a sectional elevation of an engine having the invention incorporated therein.

Figure 2 is an enlarged sectional view of the fuel admission valve.

The engine illustrated comprises a cylinder 5 having a combustion chamber 6 and a piston 7 operating in the cylinder and connected with a suitable crank shaft (not shown) as by means of the usual connecting rod 8. A spark plug 9 or other suitable igniter is provided for igniting the charge in the combustion chamber at the proper time.

The engine is provided with the usual inlet valve 10, a housing 11 replaces the usual intake manifold and is arranged to admit pure air to the combustion chamber through the port controlled by the valve 10. The housing is also constructed to form an oil reservoir 12, the oil level therein being controlled by a float 13 and the usual float controlled valve.

The hydrocarbon fuel is supplied to the engine in the form of a liquid and is vaporized within the cylinder by contact with a hot plate and also by the rush of air.

The valve mechanism controlling the admission of the raw fuel is illustrated in detail in Figure 2, the same being constructed in the form of a plug 14 adapted to be screwed into the cylinder and containing a valve 15 for engagement with a valve seat 16 to control flow of liquid fuel from a supply passage 17. This supply passage is in communication by suitable piping 18 with the float controlled reservoir 12.

The stem 19 of the fuel admission valve slides freely in a passage 20 provided in the valve plug and carries at its lower end a cup shaped disk 21 which, in this instance, constitutes the "hot plate" referred to. The upper end of the valve stem is slidingly held in a guide passage 22 and is provided with a head 23 which serves as a stop, limiting the downward or opening movement of the valve and also as a weight tending to open the valve. A spring 24 is also provided in the illustration bearing on this head and exerting tension to hold the valve in open position. This spring is shown as engaging with a cap 25 secured to the plug and forming a tight cover over the upper end of the valve stem.

The operation of the invention is as follows:

On the intake stroke of the piston the air inlet valve 10 opens and a charge of fresh air is taken into the cylinder through the port 26. During this intake stroke of the piston the fuel admission valve 15 opens by reason of the spring tension at 24 and by reason of the reduced pressure produced within the cylinder by the movement of the piston. This causes raw liquid fuel to flow or trickle from the supply passage 18 down around the valve stem 19 into the cup 21 at the lower end of the valve stem where such liquid is vaporized by contact with the cup which has retained sufficient heat from previous explosions to accomplish such vaporization. This raw fuel is admitted only in sufficient quantities to accomplish a proper combustible mixture with the air, the amount of such fuel being controlled by means of a suitable valve 27 provided in the pipe line.

With this construction it will be seen that the cylinder can be almost completely charged with air, which may be relatively cool and unexpanded. The vaporization of the liquid fuel is accomplished directly in the cylinder and therefore no external heat is necessary to accomplish proper vaporization. This method of vaporization permits the use of relatively low grade fuel oils and the manner of mixing the same with fresh air taken into the cylinder gives a higher volumetric efficiency than where external vaporization and admixture with air, as heretofore practiced, is used.

On the compression stroke of the piston the fuel inlet valve is closed by the pressure on the lower face of the valve cup 21 and said valve is maintained closed by the pressure thereon during the succeeding power and exhaust strokes of the piston. In other words, the fuel inlet valve opens only on the intake stroke and remains closed during the other strokes of the piston.

The constant level reservoir furnishes a liquid fuel supply of a constant head so that when the proper adjustment of the liquid flow is obtained, the engine will continue to run without further adjustment.

While the invention primarily is intended to furnish a simple arrangement for changing one type of engine to one of another type, it is possible obviously to construct engines in the first instance to embody the features herein disclosed.

What I claim is:

1. A fuel inlet valve for internal combustion engines comprising a plug provided with a liquid passage and a valve seat at the end of said passage, a valve for cooperation with said seat provided with a stem operating in the liquid passage and with a vaporizing cup at the end of said stem and in line with the liquid passage and a fuel supply connection to said plug.

2. A fuel inlet valve for internal combustion engines comprising a plug provided with a liquid passage and a valve seat at the end of said passage, a valve for cooperation with said seat provided with a stem operating in the liquid passage and with a vaporizing cup at the end of said stem and in line with the liquid passage, a fuel supply connection to said plug, a head on the upper end of the valve stem and a cover over said head.

3. A fuel inlet valve for internal combustion engines comprising a plug provided with a liquid passage and a valve seat at the end of said passage, a valve for cooperation with said seat provided with a stem operating in the liquid passage and with a vaporizing cup at the end of said stem and in line with the liquid passage, a fuel supply connection to said plug, a head on the upper end of the valve stem, a cover over said head and a spring interposed between said cover and the head of the valve stem.

4. A liquid fuel admission valve for internal combustion engines comprising a valve body having a liquid inlet passage, a passage in communication therewith and provided with a valve seat, a valve cooperating with said valve seat and provided with a stem operating in the last mentioned passage and an enlargement on said stem at the end of said passage and providing a pressure head for operating the valve and a hot plate for vaporizing the liquid flowing from the passage.

5. The combination of a housing arranged to be affixed to the intake chamber of an internal combustion engine arranged to form an air inlet and a constant level reservoir for liquid fuel, of a liquid fuel admission valve connected with said reservoir and arranged to be connected with the combustion chamber of the engine, comprising a valve seat and a cooperating valve element, said valve element having a combination pressure head and vaporizing plate exposed within the combustion chamber of the engine.

6. The combination of a housing arranged to be affixed to the intake chamber of an internal combustion engine arranged to form an air inlet and a constant level reservoir for liquid fuel, of a liquid fuel admission valve connected with said reservoir and arranged to be connected with the combustion chamber of the engine, comprising a valve seat and a cooperating valve element, said valve element having a combination pressure head and vaporizing plate exposed within the combustion chamber of the engine and a regulating valve interposed in the connection between the reservoir and the fuel inlet valve.

7. In an internal combustion engine, an automatically opening fuel inlet valve having a valve element and a combustion pressure head and vaporizing plate exposed to the pressure and heat within the combustion chamber of the engine.

8. In internal combustion engine provided with an air port and with a passage for the admission of raw fuel oil, a valve opening on the intake stroke of the piston for admitting the raw fuel oil directly into the combustion chamber, a valve, and a hot plate in the combustion chamber for vaporizing the raw fuel oil in contact with the air taken in at the air admission port.

9. An internal combustion engine provided with an air port and with a passage for the admission of raw fuel oil, a valve opening on the intake stroke of the piston for admitting the raw fuel oil directly into the combustion chamber, a valve, and a hot plate in the combustion chamber for vaporizing the raw fuel oil in contact with the air taken in at the air admission port and adjustable means for controlling the flow of the fuel oil.

10. An internal combustion engine provided with an air port and with a passage for the admission of raw fuel oil, a valve opening on the intake stroke of the piston for admitting the raw fuel oil directly into the combustion chamber, a valve, and a hot plate in the combustion chamber for vaporizing the raw fuel oil in contact with the air taken in at the air admission port and a constant level reservoir for the fuel oil connected with the passage aforesaid.

11. In an internal combustion engine, a cylinder provided with a valve controlled air intake, a liquid fuel conduit, a check valve controlling admission of said liquid fuel into the combustion chamber of the cylinder and a hot plate carried by said check valve for vaporizing the liquid fuel within the combustion chamber.

12. An internal combustion engine having a pressure controlled liquid fuel admission valve provided with a stem, a passage about said stem and a plate on said stem at the end of said liquid passage and exposed to the pressure and heat of the combustion chamber for effecting control of the valve and vaporization of the liquid fuel.

13. An internal combustion engine having a pressure controlled liquid fuel admission valve provided with a stem, a passage about said stem and a plate on said stem at the end of said liquid passage and exposed to the pressure and heat of the combustion chamber for effecting control of the valve and vaporization of the liquid fuel, said plate having an upturned edge to provide a cup for the liquid fuel.

14. An internal combustion engine having an air intake valve for admitting a charge of air into the combustion chamber and a raw fuel inlet valve operated automatically by the suction of the intake stroke to admit raw fuel directly into the combustion chamber and a vaporizing cup carried by said valve in position to receive the thus admitted raw fuel, said cup being exposed to the pressure and heat of the combustion chamber and being of sufficient area to form a pressure head actuated by the pressure within the cylinder to hold the valve closed at all other than the intake strokes of the engine.

In witness whereof, I hereunto set my hand this 22nd day of November, 1919.

BERNARD M. FINE.